Figure 1:
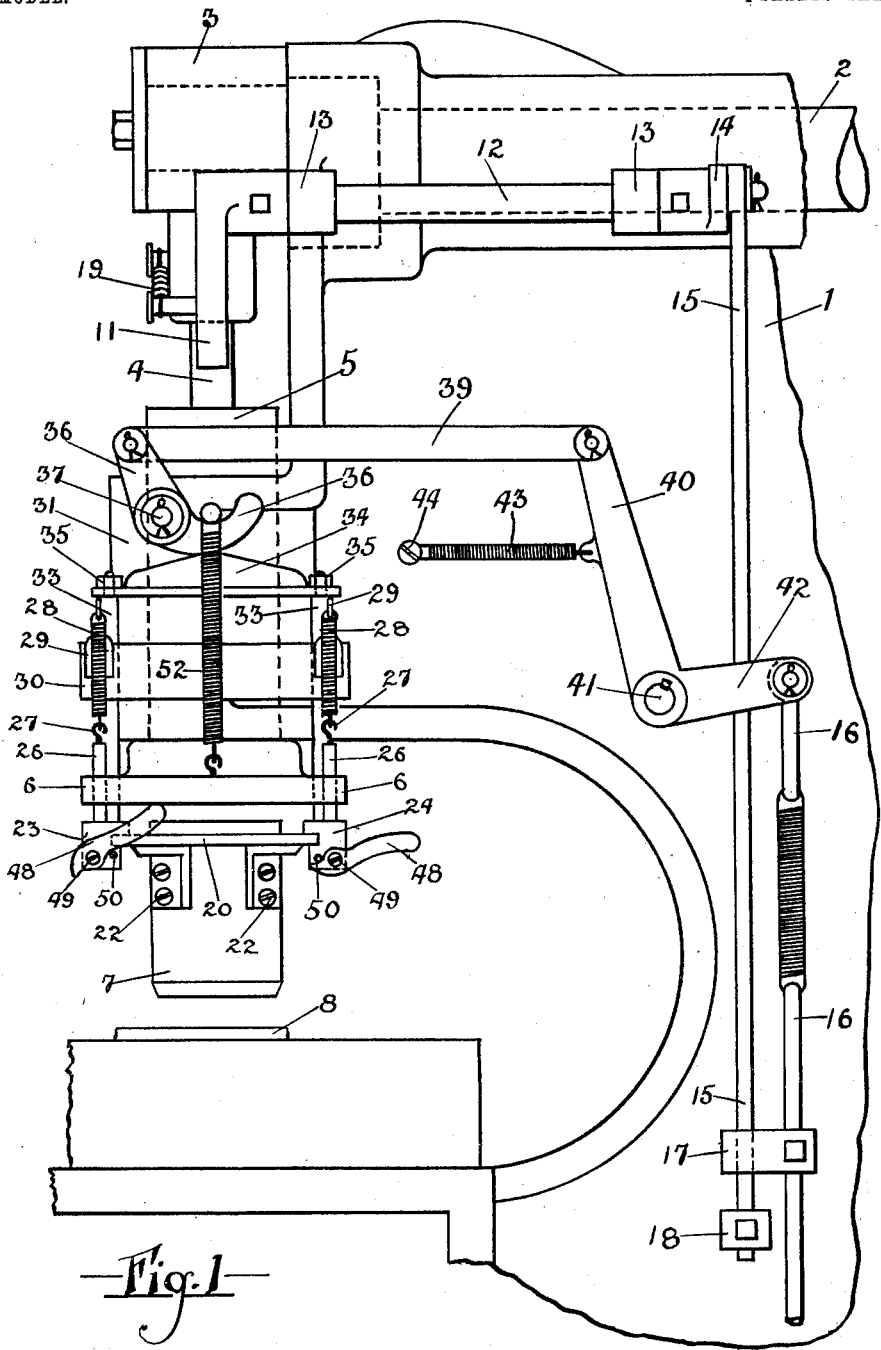

No. 732,101. PATENTED JUNE 30, 1903.
F. B. MORRIS.
CUTTING-OUT PRESS.
APPLICATION FILED NOV. 12, 1901.
NO MODEL. 4 SHEETS—SHEET 3.

No. 732,101. PATENTED JUNE 30, 1903.
F. B. MORRIS.
CUTTING-OUT PRESS.
APPLICATION FILED NOV. 12, 1901.
NO MODEL. 4 SHEETS—SHEET 4.

Witnesses
Inventor
Frank B. Morris
By Wm. E. Boulter.
Attorney

No. 732,101.

Patented June 30, 1903.

UNITED STATES PATENT OFFICE.

FRANK BROOKS MORRIS, OF LEICESTER, ENGLAND.

CUTTING-OUT PRESS.

SPECIFICATION forming part of Letters Patent No. 732,101, dated June 30, 1903.

Application filed November 12, 1901. Serial No. 81,989. (No model.)

*To all whom it may concern:*

Be it known that I, FRANK BROOKS MORRIS, boot manufacturers' manager, a subject of the King of Great Britain, and a resident of Mayfield road, London road, Leicester, England, have invented certain new and useful Improvements in or Relating to Cutting-Out Presses; and I do hereby declare the following to be a full, clear, and exact description of the invention, such as will enable others skilled in the art to which it appertains to make and use the same.

This invention relates to cutting-out presses, and has particular reference to the type or character of press in which a vertically-reciprocating head or buffer descends upon a knife previously placed upon leather, paper, cloth, or other material to be cut laid on the table of the press and forces it (the knife) through the material, thereby producing a blank of the required shape and size—such, for example, as a sole, top piece, lift, stiffener, or other part of a boot or shoe or an envelop, label, or other article. As is well understood, in connection with presses of this type the knife is first arranged by the operator in the proper position on the material to be cut, and then the two (knife and material) are moved by the operator under the descending head of the press, which presses upon the knife with sufficient force to cause it to cut out the blank, and this operation is repeated. In this connection it will be noticed that the operator is continuously handling the knife and material to adjust the former in proper position on the latter before placing the same under the press, and a certain amount of unnecessary time is involved in this operation which it is the object of the present invention to avoid for the purpose of increasing the output of the press—*i. e.*, the number of articles cut thereby in a given time.

According to this invention there is no necessity whatever for the pressman to handle the knife, as the knife is carried in the head or buffer of the press and can be lowered onto the leather or other material which, as the pressman has both hands at liberty, may be adjusted by him in the proper position under the knife before the buffer is allowed to descend on the latter to force it through the material to cut out the desired blank.

This invention therefore comprises as its essential feature a knife detachably supported in the head or buffer of the machine and means for lowering it onto the material independent of the mechanism by which the head of the press is lowered to perform the cutting operation.

The invention will be understood from the following further description in reference to the accompanying drawings, in which—

Figure 2:
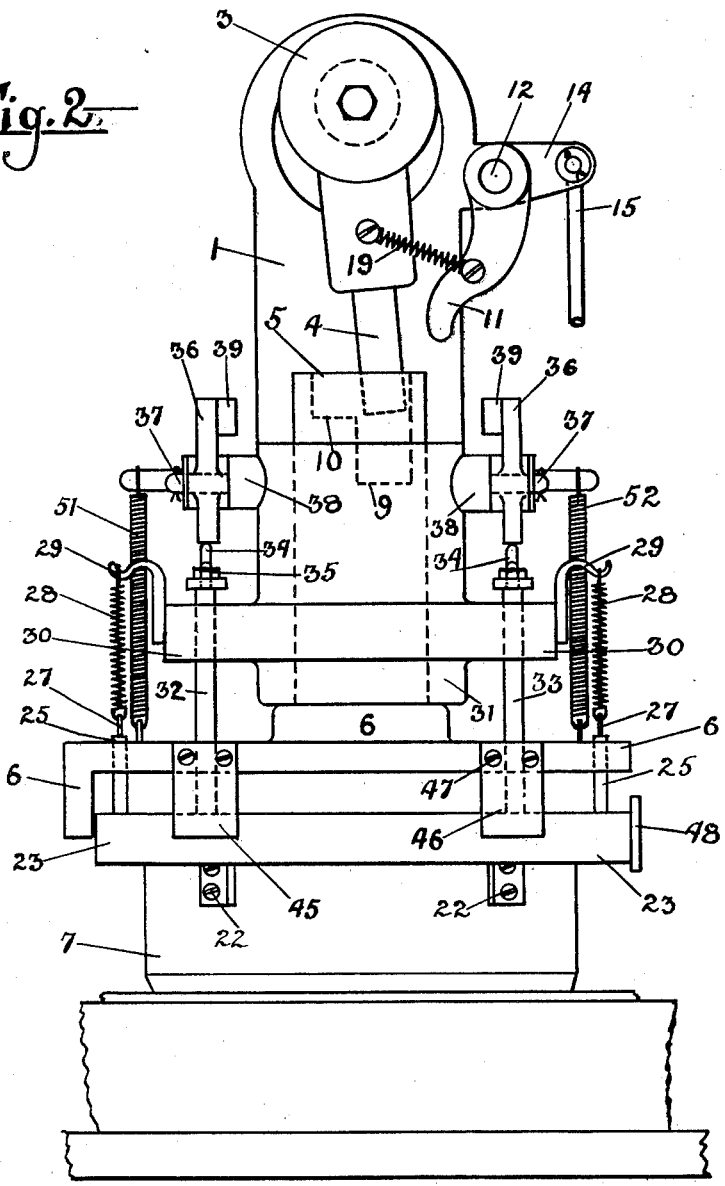
Figure 3:
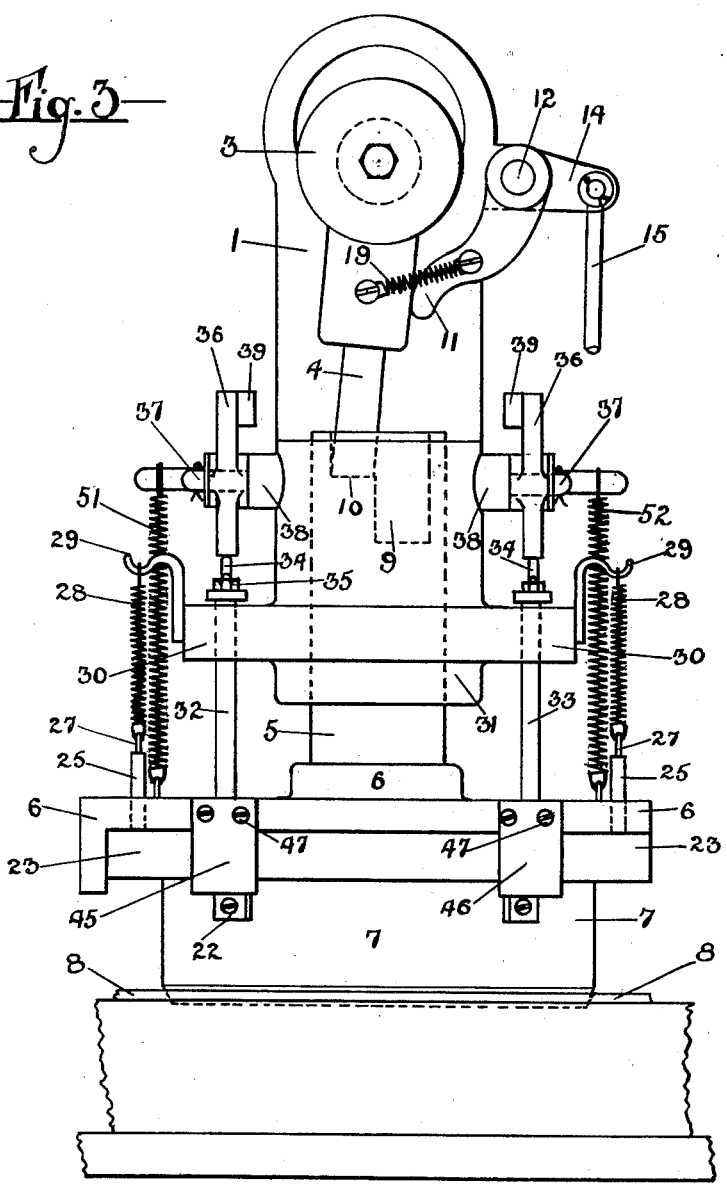
Figure 4:
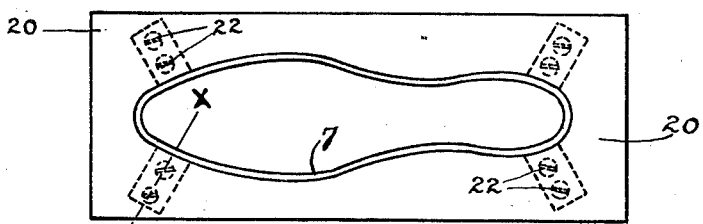
Figure 5:
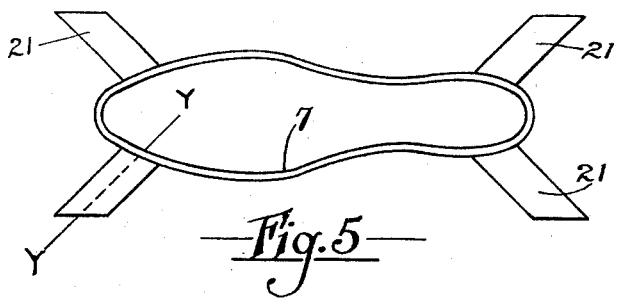
Figure 6:
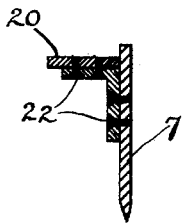
Figure 7:
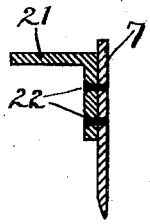

Figure 1 is a side elevation of sufficient of a press of the type referred to to illustrate my invention which is applied thereto, the knife being shown in its raised position. Fig. 2 is a front elevation of the press, showing the knife lowered onto the material preparatory to being forced through the latter. Fig. 3 is a similar view showing the buffer as having descended onto the knife and forced it through the material to cut out the blank. Fig. 4 is a plan of a knife having a projecting flange all around to fit into the groove in the knife-carrier bars. Fig. 5 is a similar view showing the knife provided with projections at each end instead of a continuous flange. Fig. 6 is a vertical section on the line X X of Fig. 4. Fig. 7 is a similar view on the line Y Y of Fig. 5.

1 represents the standard or framing of the press, in the upper part of which is a driven shaft 2, carrying on its end an eccentric 3, which raises and lowers a rod 4, the lower end of which is located within a cavity in the upper end of a plunger 5, carrying on its end a head or buffer 6, which descends upon a knife 7 and forces it through leather or other material 8 to cut out a blank or shape therefrom. While the rod 4 moves up and down in the deep cavity 9, as in Fig. 2, the plunger 5 and buffer 6 on the end thereof are not depressed, but remain quiescent; but when the rod 4 is moved laterally into the position indicated in Fig. 3 the end of the rod 4 descends upon the ledge 10 and lowers the plunger 5 and buffer 6, the latter onto the knife 7 to force it through the material 8. The rod 4 is moved into the position shown in Fig. 3 to depress the plunger at the required time by means of an arm 11 on the end of a rocking shaft 12, carried in bearings 13, Fig. 1, on the side of the framing and actuated through the medium of a short arm 14 and rod 15 connected thereto, which rod is lowered for that purpose by depressing a foot-pedal. In the present instance, however, the rod 15 is lowered by means of another rod 16, leading down to a foot-pedal. (Not shown in the drawings.) When the last-named rod 16 is lowered, a fixed guide-block 17 thereon, and through which the rod 15 also passes, bears upon a fixed collar 18 on the rod 15 and depresses the latter to rock the shaft 12 and move the arm 11 against the eccentric-rod 4, as hereinbefore described. When the operator's foot is removed from the pedal, the latter is raised by a spring, as is common to most pedal-machines, thereby withdrawing the arm 11, which by means of a spring 19, connected thereto, also withdraws the eccentric-rod 4 into its inoperative position. (Shown in Fig. 2.)

So far the press is of well-known construction.

For the purposes of this invention the knife is provided either with a projecting flange 20, Figs. 1, 4, and 6, or projections 21, Figs. 5 and 7, secured thereto by screws 22. The said flange or projections is or are adapted to be slid into two grooved carrier plates or bars 23 24, located under the buffer 6 and one on each side thereof. Each carrier-plate 23 24 is supported by two short rods 25 26, projecting upwardly therefrom and terminating in a hook 27, Fig. 1, connecting it to a spring 28, the other end of which is attached to the hooked end of an arm 29, projecting from a collar 30, fixed to the tubular sleeve or boss 31, forming an integral part of the framing of the press and in which the plunger 5 is located. The said springs keep the carrier-plates normally drawn close up against and in contact with the under surface of the buffer 6—i. e., in their raised positions. Each carrier-plate has also two other rods 32 33 rising upwardly therefrom, connected at their upper ends by a bridge or cross-bar 34, fastened thereon by nuts 35. Bearing on each of the two cross-bars is the curved end of a lever 36, fulcrumed at 37 to the boss 38, the object of which lever is to depress the said cross-bar 34, and thereby also lower the knife-carriers 23 24 until the knife rests on the material, as shown in Fig. 2, preparatory to the descent of the buffer 6 to complete the cutting operation. Each lever 36 receives its motion to lower the knife from a connecting-rod 39 and lever 40, the two levers, one each side of the framing, being carried on a rocking shaft 41, passing through the framing, and to one end of the said shaft there is attached an arm 42, connected also to the rod 16, which leads down to a foot-pedal from which the said rod is actuated, as hereinbefore described. A spring 43, attached at 44 to the framing and also to the lever 40, restores the lever 36 to its normal and original position, as shown in Fig. 1, after it has lowered the knife 7 onto the material, and the springs 28 raise the knife-carriers 23 24 and the knife 7 after the cutting operation. Plates 45 46, depending from each side of the buffer 6, Figs. 2 and 3, to the edge of which they are fastened by screws 47, form guides for the knife-carriers in their up-and-down movements. A lever 48, fulcrumed at 49 to the end of the grooved carriers 23 24, may be placed in front of the knife-plate, as indicated on the left-hand side of Fig. 1, to keep the knife from sliding out of the grooves therein and moved into the position shown on the right-hand side of the same figure when it is desired to remove the knife for the purpose of taking out the blanks therein. The depth of the knife is considerably increased, so as to reduce the frequency of its removal from its carriers for taking out the blanks therefrom. A stop-pin 50 limits the movement of the lever in each direction. The springs 51 52, connected at one end to the buffer 6 and at the other end to the boss 31, raise the buffer 6 after it has been lowered for the cutting operation and maintain it normally at its highest point.

The action of the press is as follows: The operator places his foot upon the foot-pedal, thereby lowering the rod 16, which, acting upon the levers 40, connecting-rods 39, and levers 36, depresses the cross-bars 34, and thereby lowers the knife-carriers 23 24 and the knife 7 until the latter rests upon the material 8 to be cut. By the time the knife has reached the material the guide-block 17 has come into contact with the fixed collar 18, which is pressed downward thereby, thus lowering the rod 15, rocking the shaft 12, which causes the arm 11 to move the eccentric-rod 4 onto the ledge 10 of the plunger 5, thereby suddenly descending the latter and the buffer 6, which buffer, falling on the knife 7, forces the latter through the material and cuts out the blank. Upon the operator removing his foot from the pedal the movement of the parts is reversed, resulting in the knife 7, knife-carriers 23 24, and plunger 5 being returned to their raised positions in Fig. 1.

By means of this invention the operator has both his hands at liberty, (instead of having to handle the knife,) and by placing his foot upon the pedal he can lower the knife for the purpose of adjusting the material in position underneath it preparatory to the descent of the buffer to force the knife through the material and cut out the blank.

The invention is applicable to other types of cutting-presses with descending or vertically-reciprocating heads or buffers than the one hereinbefore described, and illustrated in the accompanying drawings.

I claim—

1. In a press of the character described, the combination with reciprocable knife-carriers, a knife carried thereby, rods extending upwardly from the carriers, and cross-bars connecting said rods as described, of levers arranged to bear upon the said cross-bars and depress them, and means for operating said levers from a foot-pedal.

2. In a press of the character described, the combination with reciprocable knife-carriers, a knife carried thereby, rods extending upwardly from the carriers, and cross-bars connecting said rods as described, of levers arranged to bear upon the said cross-bars and depress them, means for operating said levers from a foot-pedal, and springs arranged to raise the knife-carriers and knife when the cross-rods are freed from the action of the levers bearing thereon.

3. In a press of the character described, the combination with reciprocable knife-carriers, a knife carried thereby, rods extending upwardly from the carriers and cross-bars connecting said rods in the manner described, of rock-levers arranged to bear at one end upon the cross-bars and means for operating the rock-levers from a foot-pedal comprising a lever connected to the other end of each of the rock-levers and adapted to rock the same as set forth.

4. In a press of the character described, the combination with reciprocable knife-carriers and a knife carried thereby and connections between the knife-carriers and a foot-pedal whereby the said carriers and knife may be depressed, comprising a lever and an abutment thereon, of means for imparting further movement to the knife-carrier and knife comprising a buffer, a plunger carrying said buffer and provided with a recess and a shoulder as described, a rod adapted to be reciprocated and to be moved laterally, for the purpose set forth and means for moving the rod laterally comprising a rock-shaft, an arm thereon adapted to operate the said laterally-movable rod, a lever on said rock-shaft and an abutment in the last-mentioned lever adapted to be struck by the first-mentioned abutment.

5. In a cutting-press of the character described, the combination with the reciprocating head or buffer, of a knife and knife-carrier arranged thereunder, a foot-pedal, and means interposed between said carrier, buffer, and the foot-pedal whereby upon the latter being depressed, the knife-carrier is lowered until the knife rests upon the material to be cut and the buffer is caused to descend upon the said knife for the purpose described.

In testimony whereof I affix my signature in presence of two witnesses.

FRANK BROOKS MORRIS.

Witnesses:
E. N. LEWIS,
GEORGE LESTER.